(12) United States Patent
Wagner et al.

(10) Patent No.: US 7,643,706 B2
(45) Date of Patent: Jan. 5, 2010

(54) IMAGE MANAGEMENT TOOL WITH CALENDAR INTERFACE

(75) Inventors: Peter K. Wagner, Sunnyvale, CA (US); Jeffrey L. Robbin, Los Altos, CA (US); Joshua D. Fagans, Redwood City, CA (US); Timothy B. Martin, Sunnyvale, CA (US); Timothy E. Wasko, High River (CA)

(73) Assignee: Apple Inc., Cupertino, CA (US)

( * ) Notice: Subject to any disclaimer, the term of this patent is extended or adjusted under 35 U.S.C. 154(b) by 918 days.

(21) Appl. No.: 11/033,238

(22) Filed: Jan. 7, 2005

(65) Prior Publication Data

US 2006/0156259 A1 Jul. 13, 2006

(51) Int. Cl.
*G06K 9/03* (2006.01)
*G06F 17/21* (2006.01)
(52) U.S. Cl. ................. 382/309; 382/305; 715/963
(58) Field of Classification Search ........... 382/284, 382/309, 305; 348/207.99; 707/104, 1; 715/810, 715/963
See application file for complete search history.

(56) References Cited

U.S. PATENT DOCUMENTS

2002/0140820 A1 10/2002 Borden, IV

2004/0078389 A1 4/2004 Hamilton
2004/0125150 A1 7/2004 Adcock et al.

FOREIGN PATENT DOCUMENTS

| EP | 1 453 315 | 1/2004 |
|---|---|---|
| JP | 11215457 | 6/1999 |
| JP | 2000261749 | 9/2000 |
| JP | 2002149682 A | 5/2002 |
| JP | 2004260710 A | 9/2004 |
| JP | 2004297649 | 10/2004 |
| JP | 2004364039 A | 12/2004 |
| WO | WO 02/057959 | 7/2002 |

OTHER PUBLICATIONS

European Patent Office, "Communication pursuant to Article 94(3) EPC," EP App. No. 06000274.8, dated Feb. 1, 2008, 1 page.
European Patent Office, "Extended Search Report," EP App. No. 06000274.8, dated May 12, 2007, 14 pages.

*Primary Examiner*—Duy M Dang
(74) *Attorney, Agent, or Firm*—Hickman Palermo Troung & Becker LLP

(57) ABSTRACT

Techniques are provided for automatically organizing and presenting photographs based on the date information associated with photographs. In one embodiment, a calendar-like user interface is provided. By interacting with the user-interface, the user can select specific dates. In response to the user's selections of the specific dates, the image organization tool displays all photographs that are associated with date information that falls within the specific dates.

16 Claims, 9 Drawing Sheets

IMAGE MANAGEMENT TOOL WITH CALENDAR INTERFACE

FIELD OF THE INVENTION

The present invention relates to digital images and, more specifically, to techniques for organizing and presenting digital images.

BACKGROUND

One of the primary benefits of digital photography is the ability to take photographs without worrying about a per-photo cost of film and development. As a result, people may take scores of photos under situations where they previously would have only taken a few. This proliferation of photographs has its downside, however, when it comes to organizing and accessing the images in an intelligent manner.

One way to organize digital photographs involves taking advantage of the fact that the electronic data associated with each photograph exists as an electronic file. Thus, file systems provided by computer operating systems may be used to impose order on a set of digital photographs. For example, a photographer may create separate electronic file folders for each photographed event, and store the image files of all photos taken at a particular event in the corresponding electronic file folder.

When a more sophisticated organizational structure is desired, digital image management applications may be used. Digital image management applications typically provide a variety of ways to organize and view digital images. For example, many digital image management applications allow users to organize photos into digital albums, where a single photo may concurrently belong to several albums.

Whatever the organizational mechanism, digital image management applications typically require the user to specify, on a per-photo basis, the photo-to-organizational-structure mapping. Given the potentially vast number of digital images that a photographer may need to manage, it is desirable to provide a less labor-intensive technique for managing digital photos.

Rather than make static photo-to-organizational-structure assignments, it is possible to manage the photos by applying dynamic filters to a photo collection. A filter is typically associated with a particular set of criteria, such as "size >2 megabytes". After applying a filter, the user is presented with only those photos in the collection that satisfy the criteria associated with the filter. However, even the use of dynamic filters can be labor intensive. For example, a user may have to manually assign photos to categories in order to filter photos based on categories.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
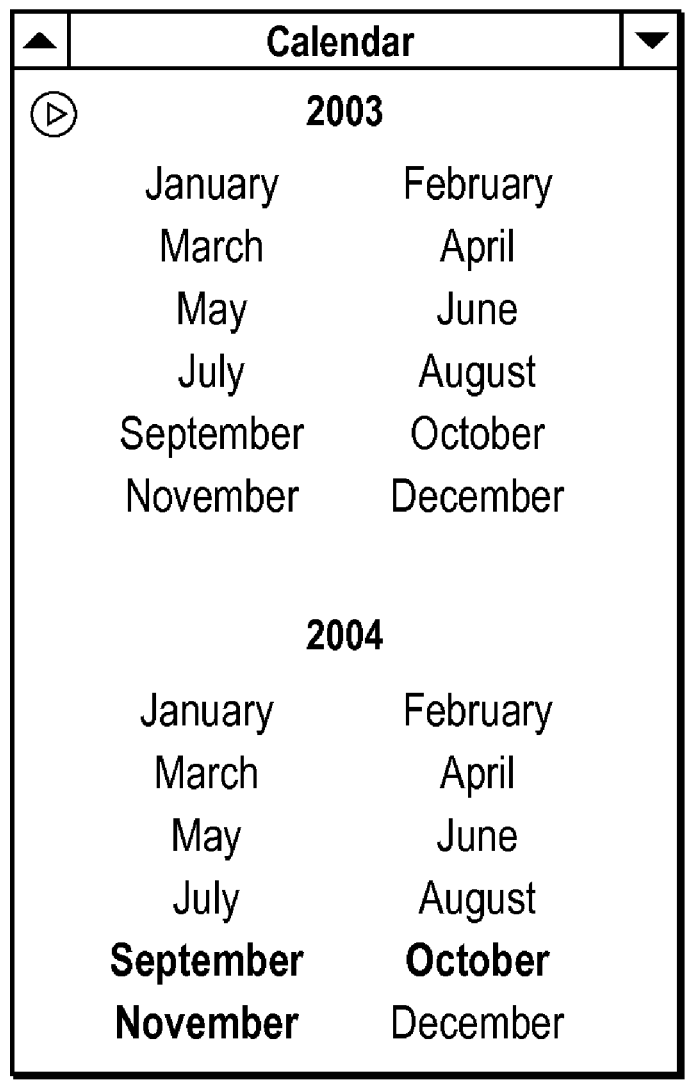
FIG. 1 is a block diagram of a calendar interface in a month-of-the-year mode, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Typically, the file for a digital photograph contains or is associated with date information. The date information may reflect, for example, the date on which the digital photograph was taken. Techniques shall be described hereafter for automatically organizing and presenting photographs based on the date information associated with the photographs. In one embodiment, an image management tool with a calendar-like user interface is provided. By interacting with the user-interface, the user can select specific dates. In response to the user's selections of the specific dates, the image management tool displays all photographs that are associated with date information that falls within the specific dates.

Date Information

Digital images may be associated with various forms of date information. For example, when a digital photo is taken, many digital cameras are designed to embed in the image file itself date information that indicates when the photo was taken. In the JPEG format, the section of the image file that contains this "capture date" information is referred to as the EXIF header.

The capture date is merely one example of date information that may be associated with an image file. Other types of dates that may be associated with an image file include a most recent modification date, a download date, a purchase date, etc. The techniques described herein are not limited to any particular type of date information.

In addition, the techniques described hereafter may be employed with date information that is embedded within the image file itself, or date information that is maintained separate from the file. For example, a last modification date for an image file may be maintained external to the image file by an operating system.

The techniques described hereafter may be used both with date information that is automatically generated, and with date information that is manually specified. For example, a "capture date" is typically automatically generated for and associated with an image file at the time the photograph is taken. Similarly, a last modification date is typically automatically generated for and associated with an image file when the file is modified within a computer system. On the other hand, an image management application may allow users to manually associate digital photos with dates.

It should be noted that the term "date information" refers generally to information about a point or period in time, and not necessarily a particular day. For example, the date information associated with an image file may indicate one or more of: a specific date (Jan. 1, 2004), a specific time of day (1:12 pm), a specific month (May 2002), a specific range of dates (May 4, 2002-May 7, 2002), etc. For the purpose of illustration, examples shall be given in which the date information identifies a specific date.

Calendar Interface

According to one embodiment, a user is presented with an interface that represents a calendar. Through interaction with the user interface, the user specifies filtering criteria that is compared against the date information associated with the image files in a collection. The user is then presented with those image files whose associated date information satisfies the specified criteria.

According to one embodiment, the calendar interface supports several display modes, including a months-of-the-year mode and a days-of-the-month mode. FIG. 1 is an example of a calendar interface in a months-of-the-year mode. In the months-of-the-year mode, a visual depiction is generated for each month a given year. In the embodiment illustrated in FIG. 1, the visual depiction of each month is simply the name of the month, surrounded by a grayed region. In alternative embodiments, the visual depiction associated with the months may differ. For example, each month may be depicted with a button, a letter, or an image. The techniques described herein are not limited to any particular way to visually depict months.

Figure 2:
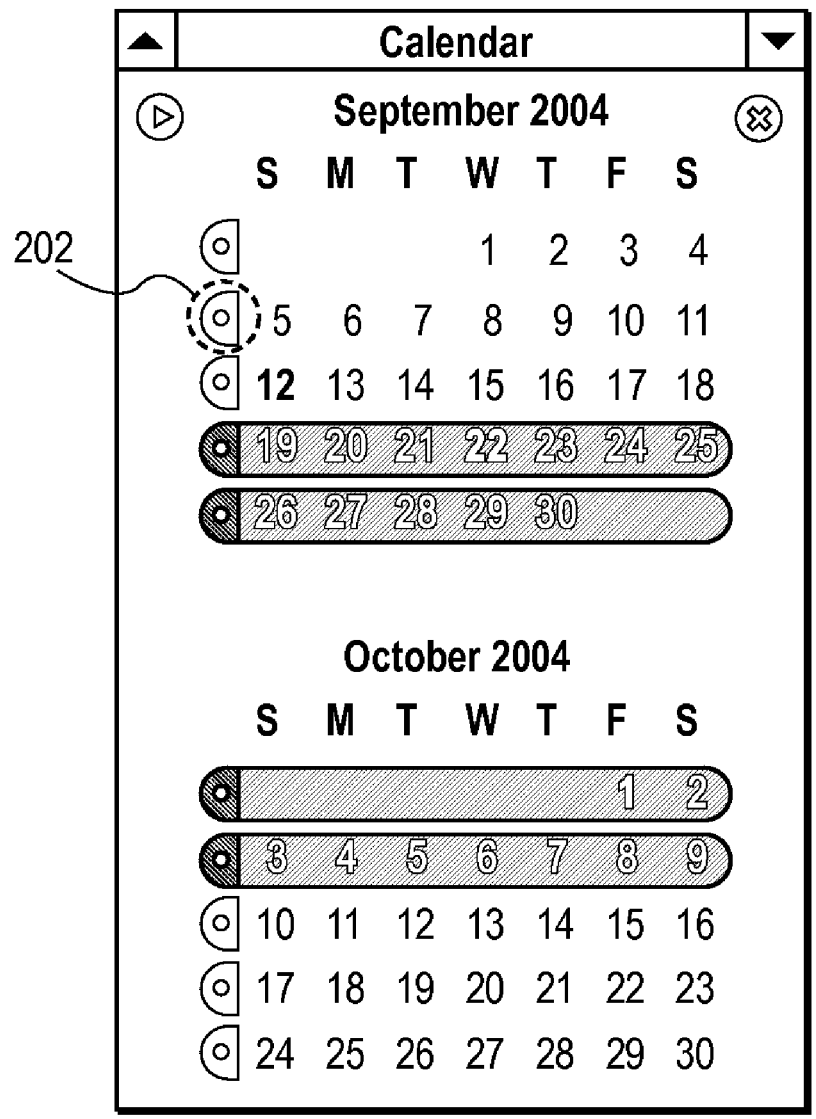
FIG. 2 is a block diagram of a calendar interface in a day-of-the-month mode, according to an embodiment of the invention.

FIG. 2 is an example of a calendar interface in a days-of-the-month mode. In the days-of-the-month mode, a visual depiction is generated for each day of a given month. In the illustrated embodiment, the visual depiction of each day is simply the number of the day. However, as with the visual depictions of the months, the visual depictions of the days may vary from implementation to implementation.

Using the Calendar Interface to Convey Information About a Collection

According to one embodiment, the visual depiction of the calendar interface is based, in part, on the date information associated with image files in a collection. For example, in the embodiment illustrated in FIG. 1, the visual depiction of each month reflects whether any image files within the collection have date information that falls within the month. Specifically, if any image files in the collection fall within a month, then the visual depiction of the month is different than the visual depiction would be if no image files in the collection fall within the month.

Referring to the embodiment illustrated in FIG. 1, if any image file within the collection has date information that falls within the month, then the name of the month is bolded. If no image file within the collection has date information that falls within the month, then the name of the month is not bolded. In the illustrated example, only the months of September, October and November of 2004 are bolded. Thus, of all the months that are represented on the calendar interface in FIG. 1, the collection of image files that is managed by the calendar interface only has image files that are associated with dates within those three months.

Similarly, in the days-of-the-month mode, the visual depiction associated with each day indicates whether any image files in the collection are associated with date information that falls within the day. Specifically, if any image files in the collection fall within a day, then the visual depiction of the day is different than the visual depiction would be if no image files in the collection fall within the day.

Referring to the embodiment illustrated in FIG. 2, if any image file within the collection has date information that falls within a day, then the number of the day is bolded. If no image file within the collection has date information that falls within the day, then the number of the day is not bolded. In the illustrated example, only the $12^{th}$ and $27^{th}$ of September, and the $1^{st}$ of October are bolded. Thus, of all the days that are represented on the calendar interface in FIG. 2, the collection of image files that is managed by the calendar interface only has image files that are associated with those three days.

Bolding the visual representation of a month or day is merely one example of how the calendar may visually reflect information about the dates associated with image files in a collection. Alternative embodiments may use any number of ways to make visual distinctions between periods for which image files are present, and periods for which image files are not present. For example, alternative embodiments may use different colors, fonts, styles, sizes, shading, etc. to visually distinguish between periods with images and periods without images. Further, the visual depiction may even reflect how many images fall within a particular period. For example, the greater the number of image files that fall within a month, the bigger and/or bolder the font that is used for the name of the month in the calendar interface.

Specifying Filtering Criteria Using the Calendar Interface

According to one embodiment, the calendar interface does not merely convey information about the date information of image files in a collection; it also serves as the mechanism through which a user may specify filtering criteria to dynamically filter the collection. Referring to FIG. 1, a user may interact with the calendar interface to select one or more of the months. For the purpose of discussion, an embodiment shall be described in which (1) a month is selected by clicking on the visual depiction of the month, and (2) a group of months is selected by dragging a bounding box around the visual depictions of the desired months. However, the specific user interactions used to select months and groups of months may vary from implementation to implementation. For example, the user may alternatively select months using a touch screen, or by entering textual command prompts.

Figure 3:
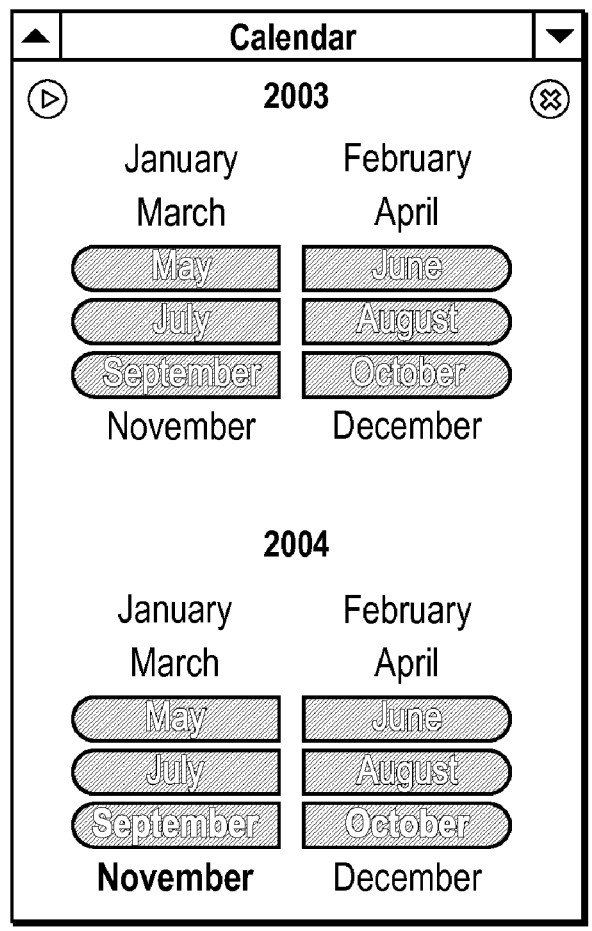
FIG. 3 is a block diagram of the calendar interface of FIG. 1, in which a user has applied an annual recurrence pattern to a set of selected months.

When a user has selected one or more months through the calendar interface, the visual depiction of those months is changed to reflect that they are selected. For example, FIG. 3 illustrates the calendar interface after the user has selected the months of May through October.

Figure 4:
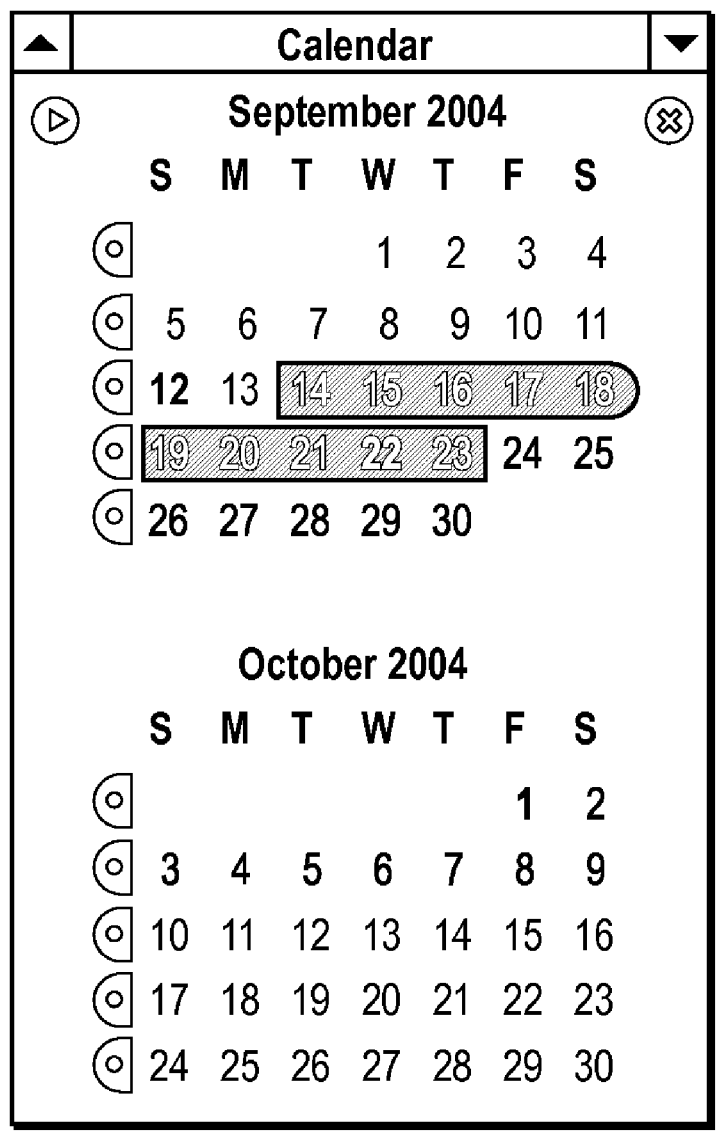
FIG. 4 is a block diagram of the calendar interface of FIG. 2, in which a user has applied an annual recurrent patter to a set of selected days within the month of September.

Similarly, the user may select specific days, or ranges of days, when the calendar is in the days-of-the-month mode. In FIG. 2, the user has selected from September 19$^{th}$ through October 9$^{th}$. In the embodiment illustrated in FIG. 2, a week selection control is provided next to each week. When a user clicks on a week selection control, all days of the corresponding week are selected. For example, clicking on week selection control 202 selects the week of Sep. 5-11, 2004. FIG. 4 illustrates the calendar interface in days-of-the-month mode, where the selected range of days has boundaries that do not correspond to the boundaries of calendar weeks.

Once a selection has been made, user interface controls may be provided to extend, add, or remove members of the selection set. For example, assume that June and July of 2004 are selected on the months-of-the-year interface. If the user holds down the command key and clicks on May 2004, then May 2004 will be added to the selected months without removing June and July 2004. If the command key is held down and a month that is in the selection set is clicked, then the month is removed from the selection set without otherwise affected the selection set membership.

Another key combination or key/mouse combination may be used to extend a selection set. For example, assume again that June and July of 2004 are currently selected. If the user presses a specified key while clicking on December 2004, the selection is automatically extended from June 2004 to December 2004, including all intervening months. These are merely examples of user interface controls that may be used to facilitate the selection of the desired time periods. The selection controls may work similarly in all calendar modes (e.g. months-of-the-year mode, days-of-the-month, and hours-of-the day mode).

Selection of Recurring Time Periods

According to one embodiment, the calendar interface provides controls for easily selecting recurring time periods. For example, in the days-of-the-month mode, the user may select a particular group of days, then right-click on the selection. In response to the right click, the user is presented with a menu that includes recurrence pattern options. The recurrence pattern options may include, among other options, "monthly, days of the week", "annually, days of the week", "monthly, by date" and "annually, by date".

If the "monthly, days of the week" option is selected, then within every month a range of days is automatically selected based on the days of the week that are currently selected. For example, in FIG. 4, the selected time period runs from the second Tuesday to the third Thursday. If the user then selects the "monthly, days of the week" option, the second Tuesday to the third Thursday of every month will be selected.

If the "annually, days of the week" option is selected, then for every year a range of days is automatically selected based on the days of the week that are currently selected. For example, in FIG. 4, the selected time period runs from the second Tuesday to the third Thursday of September, 2004. If the user then selects the "annually, days of the week" option, then the second Tuesday to the third Thursday of September for every year will be selected.

If the "monthly, by date" option is selected, then within every month a range of days is automatically selected based on the range of dates that are currently selected. For example, in FIG. 4, the selected time period runs from Sep. 14, 2004 to Sep. 23, 2004. If the user then selects the "monthly, by date" option, then the 14$^{th}$ through 23$^{rd}$ of every month will be selected.

If the "annually, by date" option is selected, then for every year a range of days is automatically selected based on the dates that are currently selected. For example, in FIG. 4, the selected time period runs from the second Sep. 14, 2004 to Sep. 23, 2004. If the user then selects the "annually, by date" option, then September 14$^{th}$ to September 23$^{rd}$ of every year will be selected.

Recurrence patterns may also be specified when the calendar is in months-of-the-year mode. For example, if the user has selected months of May through October of 2003, the user may select a "repeat annually" option so select the months of May through October of every year. FIG. 3 illustrates the calendar interface after a user has performed an annual repeat of a May through October selection.

According to one embodiment, the way that selected time periods are displayed on the calendar interface changes based on the recurrence pattern that has been applied. For example, if no recurrence pattern has been specified, then the selected time periods may be shown with one form of highlighting (e.g. blue highlighting). If a recurrence pattern has been specified, then the selected time periods may be shown with another form of highlighting (e.g. purple highlighting). Different highlighting may also be used to distinguish between the different types of recurrence patterns. For example, monthly recurrence patterns may cause the selected periods to be highlighted in green, while annual recurrence patters cause the selected periods to be highlighted in red.

The use of highlighting colors is merely one example in which selections associated with recurrence patterns may be visually distinguished from selections that are not associated with recurrence patterns. Other ways of visually indicating this distinction include, but are not limited to, changing the color, style, and/or font associated with the selection, or putting a checkmark or other visual indicator next to the selection. The techniques described herein are not limited to any particular way of visually distinguishing between selections associated with recurrence patterns and selections that are not associated with recurrence patterns.

Different implementations may use different recurrence selection techniques. For example, in one embodiment, a simple click on a date indicator may select the date without any recurrence, while a click performed while a control button is pressed may select a date and automatically apply a particular recurrence pattern. The recurrence pattern that is applied may vary, for example, based on which option key was held down at the time the date was selected. Using option keys in this manner, and using a right-click operation to bring up a menu of recurrence pattern options, are merely two examples of how a recurrence pattern may be specified. The techniques described herein are not limited to any particular mechanism for selecting and applying recurrence patterns.

Applying the Calendar-Specified Filter

In response to the user selecting one or more time periods using the calendar interface, filter criteria that reflects the selection is applied against the date information associated with the image files in the collection. Those image files that satisfy the criteria are then indicated to the user.

For example, assume that the date information is the "capture date" of the image files, as indicated within the EXIF header of the image files. Further assume that the user has used the calendar interface to select the time range from Sep. 14, 2004 through Sep. 23, 2004, as illustrated in FIG. 4. In response to the selection, the capture dates of the image files in the collection are compared against the time range from Sep. 14, 2004 through Sep. 23, 2004, and the set of image files that have capture dates in the specified time period are indicated to the user.

The way in which the image files that satisfy the specified criteria (the "filtered images") are indicated to the user may vary from implementation to implementation. In one embodiment, a list of the names of the filtered images is displayed to the user. In an alternative embodiment, thumbnails of the images in the collection are displayed in a "thumbnail region" of the screen. As a user interacts with the calendar interface, those image files that do not satisfy the criteria disappear from the thumbnail region, leaving within the thumbnail display thumbnails of only the filtered images.

Figure 5:
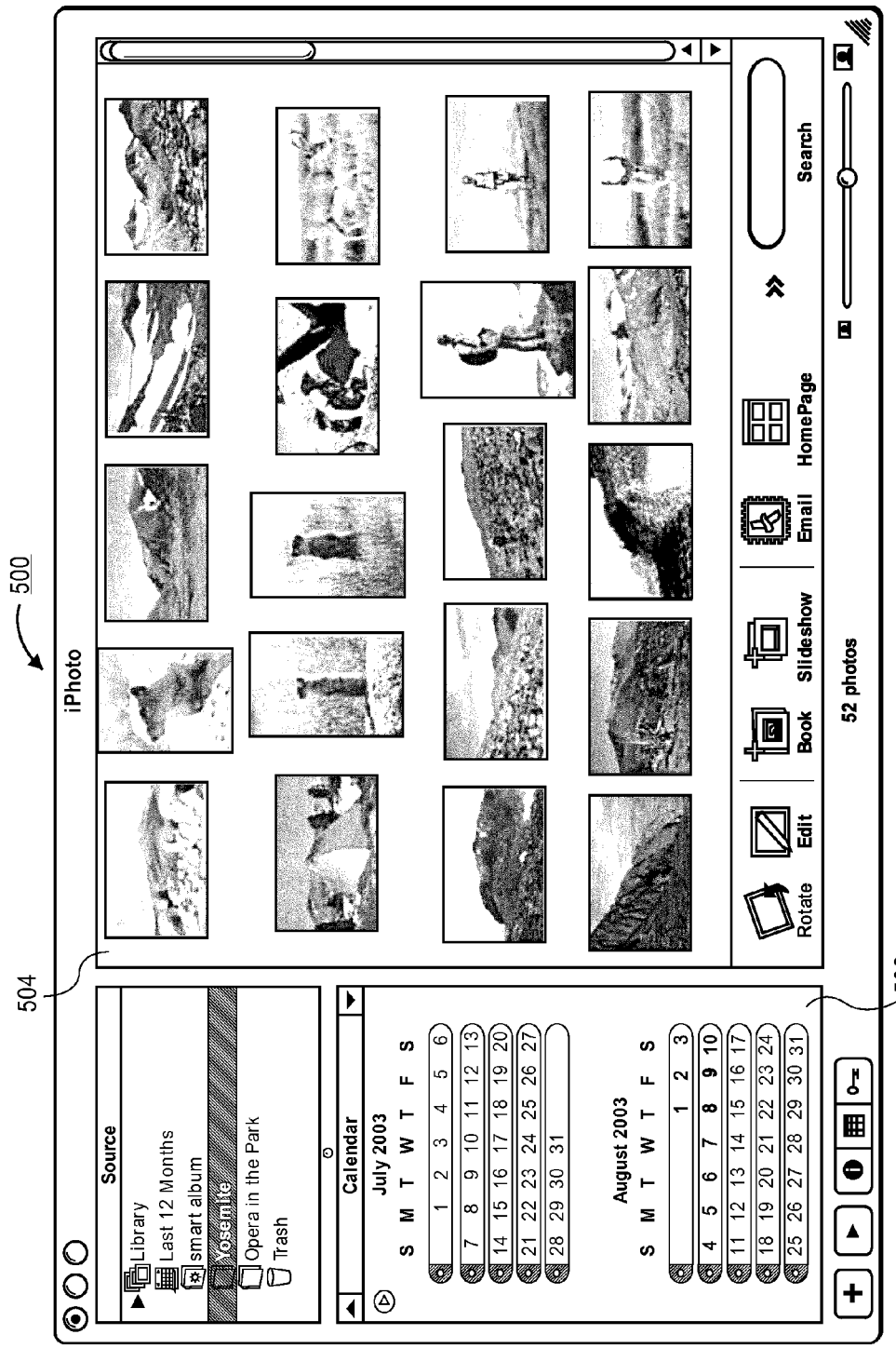
FIG. 5 is a block diagram of a screen display that includes a calendar interface and a thumbnail region.

FIG. 5 is a block diagram of a screen display 500 that includes a calendar interface 502 and a thumbnail region 504 according to an embodiment of the invention. As the user interacts with the calendar interface 502, the content of the thumbnail region 504 changes so that only those image files that satisfy the filtering criteria specified through the calendar interface are displayed.

Combined Filtering Criteria

In some embodiments, other mechanisms may be used to specify filtering criteria in combination with the calendar interface. For example, the user may have assigned image files to categories. The user may then use the calendar interface to specify date-related filtering criteria, and some other mechanism to specify category-based filtering criteria. In these circumstances, the thumbnail region 504 may display thumbnails of only those image files that satisfy all of the specified filtering criteria.

The filtering criteria that is ultimately applied to the digital images may be represented as a set of conditions that are combined using Boolean operators, such as AND, OR, XOR, etc. The techniques described herein may be used in implementations where the calendar interface is the sole mechanism for specifying filtering criteria, and/or in implementations where the calendar interface is one of many mechanisms for specifying filtering criteria. Further, the techniques described herein may be used in implementations where the logic of the filtering criteria is simple, and/or in implementations where the logic of the filtering criteria is arbitrarily complex.

Time Zone Options

Certain image capture devices include time zone information along with the date information that is associated with image files. According to one embodiment, the calendar interface may be designed to either compensate for or disregard the difference between the time zone associated with an image file and the time zone of the computer that executes the software that generates the calendar interface.

For example, if the calendar interface, executed on a computer in the Pacific Standard Time Zone, compensates for the time zone difference, a photograph taken at 1 am on January 1 in the Easter Standard Time Zone would be treated as having been taken on December $31^{st}$. In contrast, if the calendar interface, executed on a computer in the Pacific Standard Time Zone, is configured to ignore the time zone difference, the photograph taken at 1am on January 1 in the Easter Standard Time Zone would be treated as having been taken on January 1.

User Interface Options

According to one embodiment, the calendar interface includes a variety of controls to provide flexibility and ease of use to the user. For example, controls may be provided to scroll between calendar representations for earlier and later dates. Controls may also be provided to switch between various display modes, such as months-of-the-year, days-of-the-month, and hours-of-the-day modes. For example, double-clicking on the visual representation associated with a month may "drill down" to cause that month to be displayed in days-of-the-month mode.

Alternative Interfaces

Figure 6:
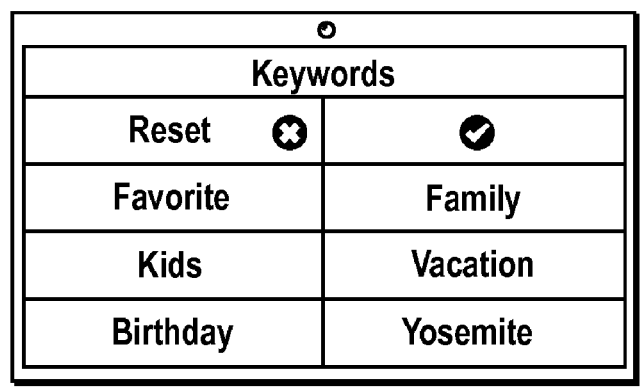
FIG. 6 is a block diagram of a screen display that includes a keyword interface through which users can filter images that belong to a collection.

According to one embodiment, an image file management tool is provided in which the calendar interface is merely one of several ways to control the content of an image display region. For example, the image file management tool may include a "keyword" view and an "information" view. When in keyword view, the tool ceases to display the calendar interface, and displays in its place a keyword interface. The keyword interface includes visual representations associated with keywords that can be associated with image files. An example of the keyword interface is illustrated in FIG. 6.

By interacting with the keyword representations, the user can associate image files with keywords, and filter based on keywords. For example, to associate one or more image files with a keyword, the user may select the image files, and drag the selection over the appropriate keyword representation. In response, the image file management tool records and association between the keyword and those image files. If the option key is pressed during the drag operation, the selected image files are disassociated with the keyword onto which they are dropped. In one embodiment, the thumbnail associated with an image file visually indicates the keywords that have been associated with the image file.

Conversely, the user may be able to select multiple keyword representations, and drag the representations over a photo or set of photos. In response to the keyword representations being "dropped" on the photo, the photo is automatically associated with all of the keywords that were dropped thereon.

Keyword filtering may be performed by selecting one or more of the keyword representations. In response to the selection, a filter criteria is established, and those image files that do not satisfy the filter criteria cease to be displayed. When multiple keywords are selected, the filter criteria may be, for example, that image files that are associated with any of the selected keywords are displayed. Thus, there is an implicit OR operation between the conditions associated with the selected keywords. Through a different user interface operation, an implicit AND operation may be established, thereby selecting only image files that are associated with all of the selected keywords. Yet a different user interface operation may be used to specify an "AND NOT" operation. The Boolean operator imposed by the selection may vary, for example, based on whether an option key is held down when the keyword representation is selected. The keyword interface may also be configured to allow users to specify arbitrarily complex Boolean operations involving the selected keywords by interacting with the keyword interface. The depiction of a keyword representation visually reflects the Boolean operator that will be used with the corresponding keyword. For example, keywords combined with OR are highlighted with blue, while keywords combined with "AND NOT" are highlighted with red.

Automatic Keyword Creation

According to one embodiment, as image files are added to the collection, the image file management tool determines whether the image file is associated with any attribute value from a certain predefined set of "attribute values of interest". The attribute values of interest may be specified by a user and/or built in to the image management tool. If the newly added image file is associated with an attribute value of interest, then the image file is automatically associated with a corresponding keyword. If no image file has previously been associated with that corresponding keyword, then the keyword is added to the set of keywords defined in the image file management tool, and a visual representation of the new keyword is displayed.

For example, assume that "raw image file type" has been established as an attribute value of interest. The first time that a raw image file is added to the collection, the keyword "raw" may be automatically established, and the newly added raw image file may automatically be associated with the keyword "raw".

Image file type is merely one example of a possible attribute value of interest. The present invention is not limited to any particular type of form of attribute values. For example, attribute values of interest may include a particular device type or device model with which the image was captured, whether the image file corresponds to a single image or a movie, whether the image is color or black and white, etc.

Information Interface

Figure 7:
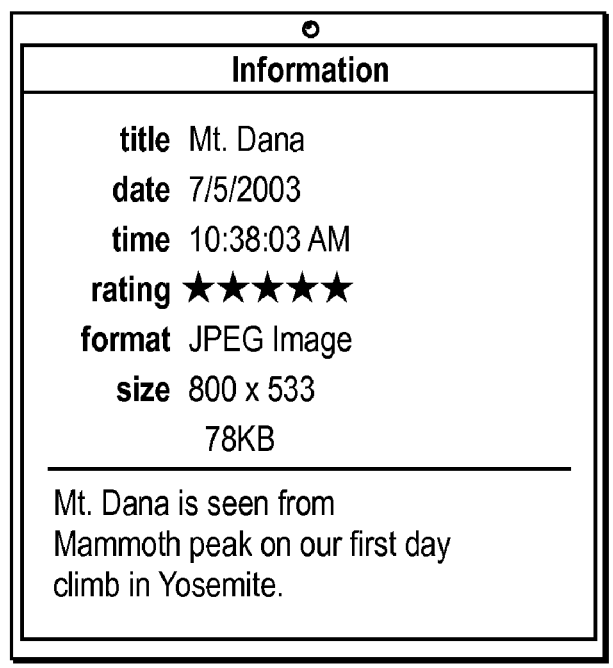
FIG. 7 is a block diagram of an information interface with which users may view information associated with images in a collection.

According to one embodiment, the image file management tool includes an "information" view. When in information view, the tool ceases to display the calendar interface, and displays in its place an information interface. An example of an information interface is illustrated in FIG. 7.

According to one embodiment, each of the various interfaces supported by the image file management tool is associated with a distinct set of user-specified characteristics. The user-specified characteristics may include, for example, the size of the various windows presented by the interface. When the user switches from one interface to another, the display is changed to reflect the user-specified characteristics associated with the newly selected interface.

Switching Between Interfaces

Figure 8:
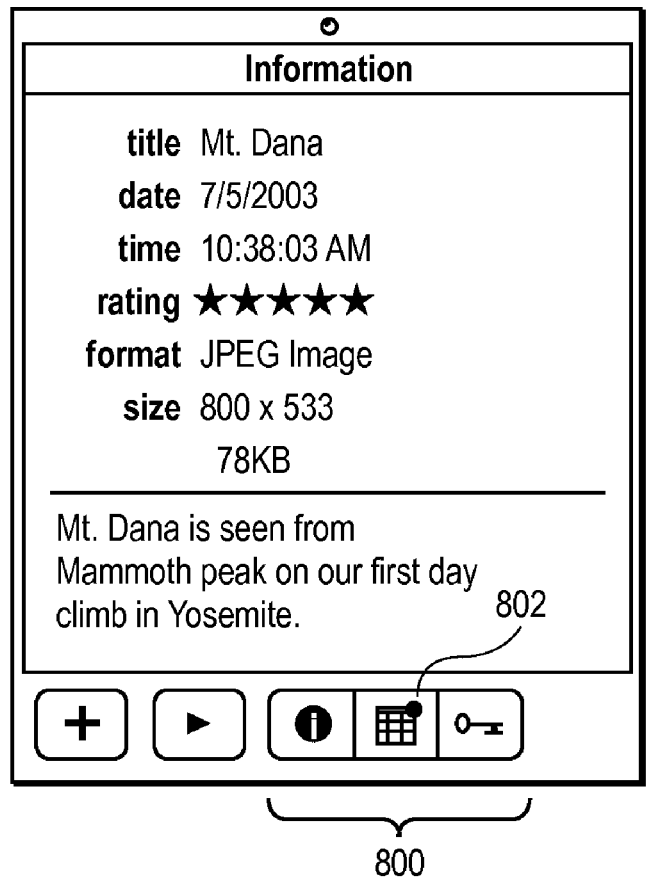
FIG. 8 is a block diagram illustrating tabs with which a user may switch between various interfaces of a image management tool.

In implementations that support multiple interfaces (e.g. the calendar, keyword and information interfaces), a user interface control is provided for switching between the various interfaces of the image file management tool. According to one embodiment, the interface switching control includes a set of tabs, each of which corresponds to an interface. FIG. 8 illustrates tabs 800 used to switch between interfaces.

Both the calendar interface and the keyword interface provide a mechanism for imposing filter criteria. According to one embodiment, when the user switches from one of these interfaces to the other, the filtering criteria imposed by the interface that the user is switching from ceases to be applied. Thus, if the user has filtered an image file collection using the keyword interface, switching to the calendar interface will remove the keyword-based filter.

Unlike the calendar and keyword interfaces, the information interface does not impose a filter. Therefore, according to one embodiment, when the user switches from the calendar interface or the keyword interface to the information interface, any filtering criteria specified by those interfaces continues to be applied while in the information interface.

According to one embodiment, while in the information interface, a visual indication is displayed to indicate whether a filter is being applied from one of the other interfaces. For example, assume that a user imposes a filter using the calendar interface, and then switches to the information interface. While in the information interface, the tab for the calendar interface may visually reflect that the calendar filter is still in effect. For example, the tab for the calendar interface may be displayed in a different color, or with a checkmark on it. In the example illustrated in FIG. 8, the tab associated with the calendar interface has a dot 802 in the top right corner. Similarly, if the user imposes a filter using the keyword interface, and then switches to the information interface, the tab for the keyword interface would visually reflect the fact that the keyword filter is still in effect.

According to one embodiment, when the user exits the information view, the image management tool automatically reverts to the interface associated with any filter that is still in effect. Thus, if a calendar-based filter was in effect when the user was in the information view, then exiting the information view will cause the image management tool to automatically revert to the calendar view. Similarly, if a keyword-based filter was in effect when the user was in the information view, then exiting the information view will cause the image management tool to automatically revert to the keyword interface view.

Hardware Overview

Figure 9:
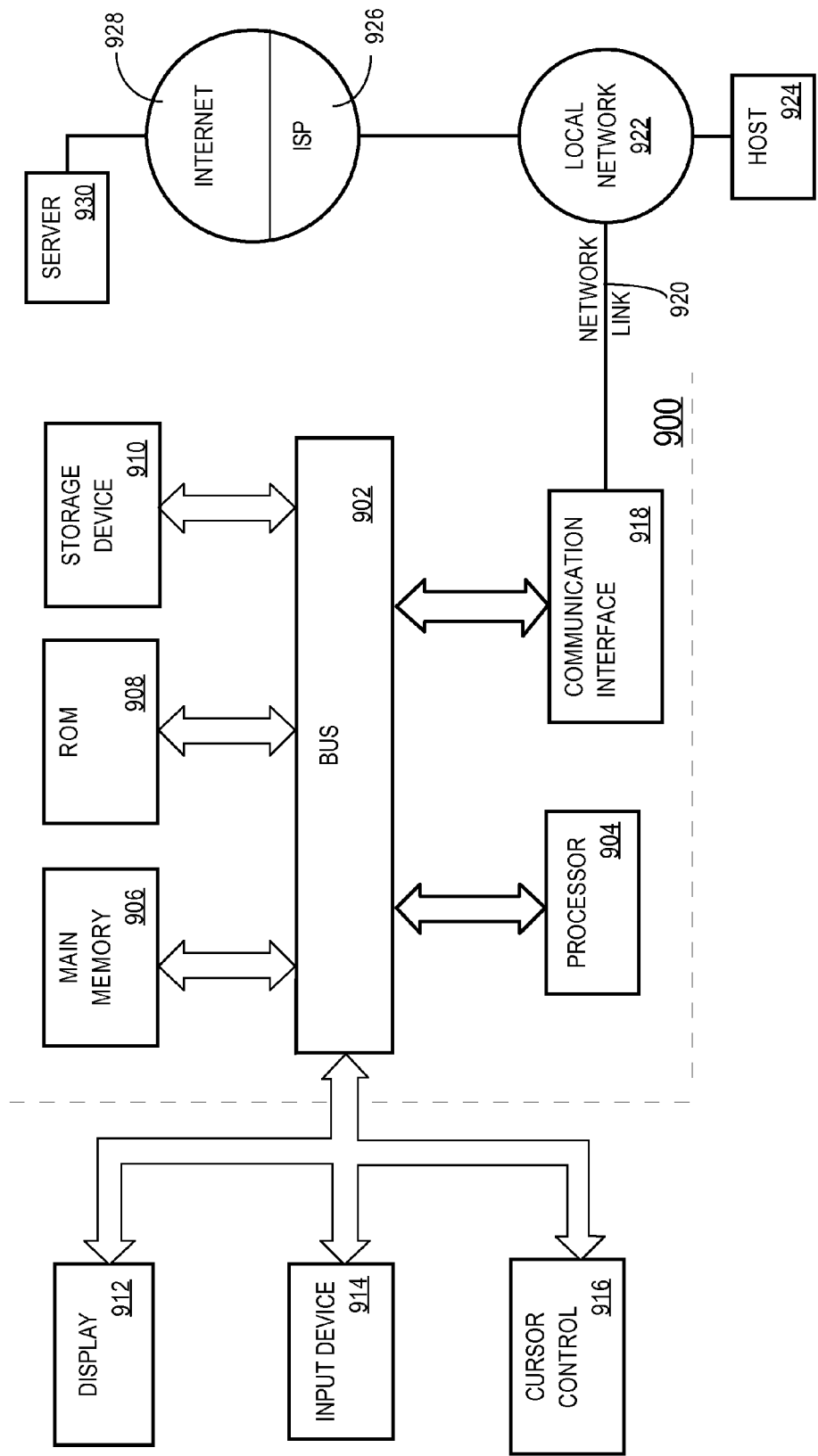
FIG. 9 is a block diagram of a computer system upon which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for specifying filter criteria for filtering a collection of image files, the method comprising:

displaying a calendar interface that includes visual representations corresponding to specific time periods;

through interactive controls on the calendar interface, receiving user input that selects one or more of the specific time periods;

prior to filtering the collection, a display region separate from the calendar interface includes visual depictions of image files, including image files that are associated with date information that does not fall within the selected time periods;

filtering the collection using filter criteria that is based, at least in part, on said user input;

in response to filtering the collection, the display region ceases to display visual depictions of any image files that are associated with date information that does not fall within the selected time periods and continues to display visual depictions of image files that are associated with date information that does fall within the selected time periods;

before receiving said user input,
the calendar interface displays visual representations of a first time period and a second time period,
the display region shows (a1) one or more visual depictions of image files that correspond to the first time period,
(b1) one or more visual depictions of image files that correspond to the second time period;
wherein said user input selects the first time period; and after receiving said user input,
the calendar interface continues to display the visual representations of the first time period and the second time period,
the display region shows
(a2) the one or more visual depictions of the image files that correspond to the first time period,
the display region ceases to show
(b2) the one or more visual depictions of the image files that correspond to the second time period;
wherein the displaying and filtering steps are performed by a computing device.

2. The method of claim 1 further comprising reflecting, in the appearance of the visual representations of the specific time periods, which specific time periods have been selected by the user input.

3. The method of claim 2 wherein the specific time periods correspond to one of months of a year, and days of a month.

4. The method of claim 1 further including the step of reflecting, in the appearance of the visual representations of the specific time periods, whether any image files in the collection are associated with date information that falls within the specific time periods that correspond to the visual representations.

5. The method of claim 1 further comprising reflecting, in the appearance of the visual representations of the selected time periods, whether a recurrence pattern has been specified in association with the selected time periods.

6. A computer-readable storage medium storing one or more sequences of instructions which, when executed by one or more processors, causes the one or more processors to perform the method recited in claim 1.

7. A computer-readable storage medium storing one or more sequences of instructions which, when executed by one or more processors, causes the one or more processors to perform the method recited in claim 2.

8. A computer-readable storage medium storing one or more sequences of instructions which, when executed by one or more processors, causes the one or more processors to perform the method recited in claim 3.

9. A computer-readable storage medium storing one or more sequences of instructions which, when executed by one or more processors, causes the one or more processors to perform the method recited in claim 4.

10. A computer-readable storage medium storing one or more sequences of instructions which, when executed by one or more processors, causes the one or more processors to perform the method recited in claim 5.

11. The method of claim 1 further comprising:
receiving user input, through said calendar interface, that specifies one or more recurrence patterns;
in response to receiving said user input, displaying only visual representations that fall within time periods that correspond to the one or more recurrence patterns.

12. A computer-readable storage medium storing one or more sequences of instructions which, when executed by one or more processors, causes the one or more processors to perform the method recited in claim 11.

13. A method comprising:
concurrently displaying, on a display, (a) a calendar interface and (b) a display region;
while the calendar interface displays a representation of a particular time period, displaying, in the display region, thumbnails of images that are associated with timestamps that fall within the particular time period;
receiving user input that selects a subset of the particular time period;
in response to the user input, performing the steps of:
continuing to display, on the calendar interface, the representation of the particular time period;
continuing to display, in the display region, thumbnails of images that are associated with timestamps that fall into the subset of the particular time period; and
ceasing to display, in the display region, thumbnails of images that are associated with timestamps that fall into the particular time period but that do not fall into the subset of the particular time period;
wherein the method is performed by one or more computing devices.

14. The method of claim 13 wherein the user input is received in response to user interaction with controls associated with the calendar interface.

15. A computer-readable storage medium storing one or more sequences of instructions which, when executed by one or more processors, causes the one or more processors to perform the method recited in claim 13.

16. A computer-readable storage medium storing one or more sequences of instructions which, when executed by one or more processors, causes the one or more processors to perform the method recited in claim 14.

* * * * *

UNITED STATES PATENT AND TRADEMARK OFFICE
CERTIFICATE OF CORRECTION

PATENT NO. : 7,643,706 B2  Page 1 of 1
APPLICATION NO. : 11/033238
DATED : January 5, 2010
INVENTOR(S) : Peter K. Wagner et al.

It is certified that error appears in the above-identified patent and that said Letters Patent is hereby corrected as shown below:

On the Title Page, Item (*) Notice: delete "by 918 days" insert -- by 1352 days --.

On the Title Page, Item (74), in "Attorney, Agent, or Firm", line 1, delete "Troung" and insert -- Truong --, therefor.

Signed and Sealed this

Fourteenth Day of September, 2010

David J. Kappos
*Director of the United States Patent and Trademark Office*